(12) United States Patent
Bauer

(10) Patent No.: US 8,741,407 B2
(45) Date of Patent: Jun. 3, 2014

(54) TUBE SYSTEM

(75) Inventor: Andreas Bauer, Ebmatingen (CH)

(73) Assignee: Eclipse International AG, Ebmatingen (CH)

( * ) Notice: Subject to any disclaimer, the term of this patent is extended or adjusted under 35 U.S.C. 154(b) by 405 days.

(21) Appl. No.: 13/147,467

(22) PCT Filed: Feb. 2, 2010

(86) PCT No.: PCT/EP2010/000626
§ 371 (c)(1),
(2), (4) Date: Dec. 28, 2011

(87) PCT Pub. No.: WO2010/089080
PCT Pub. Date: Aug. 12, 2010

(65) Prior Publication Data
US 2012/0085472 A1    Apr. 12, 2012

(30) Foreign Application Priority Data
Feb. 3, 2009    (DE) .................. 10 2009 007 163

(51) Int. Cl.
*B29C 47/00* (2006.01)
*B29D 22/00* (2006.01)
*B29D 23/00* (2006.01)
*B32B 1/08* (2006.01)

(52) U.S. Cl.
USPC ............ 428/36.9; 152/506; 152/450; 29/525; 29/428; 156/120; 156/122

(58) Field of Classification Search
USPC ............ 428/36.9; 152/506, 450; 29/525, 428; 156/120, 122
See application file for complete search history.

(56) References Cited

U.S. PATENT DOCUMENTS

| 593,544 | A | 11/1897 | Shaw |
| 1,836,902 | A | 12/1931 | Carnahan |
| 4,324,280 | A | 4/1982 | Kubota |
| 2005/0189813 | A1 | 9/2005 | Bauer |
| 2008/0295940 | A1 | 12/2008 | Tien |

FOREIGN PATENT DOCUMENTS

| CH | 695 146 A5 | 12/2005 |
| CH | 695 378 A5 | 4/2006 |
| DE | 739 848 | 10/1943 |
| DE | 807 485 C1 | 6/1951 |
| DE | 886 698 | 8/1953 |
| DE | 28 32 546 A1 | 2/1980 |
| DE | 32 10 594 A1 | 10/1983 |
| DE | 10051735 A1 | 5/2002 |
| DE | 10 2004 003 873 A1 | 8/2005 |

(Continued)

OTHER PUBLICATIONS

International Preliminary Report on Patentability/Written Opinion of the International Searching Authority of Jul. 11, 2011 and English translation thereof.

(Continued)

*Primary Examiner* — Michael C Miggins
(74) *Attorney, Agent, or Firm* — Kilpatrick Townsend & Stockton LLP

(57) ABSTRACT

The present invention relates to a hose system, in particular for vehicle tires, having a hose (12) formed into a ring, comprising polyurethane and having an at least substantially constant wall thickness along the extent thereof, wherein the substantially constant value of the wall thickness is in the range between 0.1 mm and 0.4 mm.

21 Claims, 4 Drawing Sheets

(56) References Cited

FOREIGN PATENT DOCUMENTS

Figure 1:
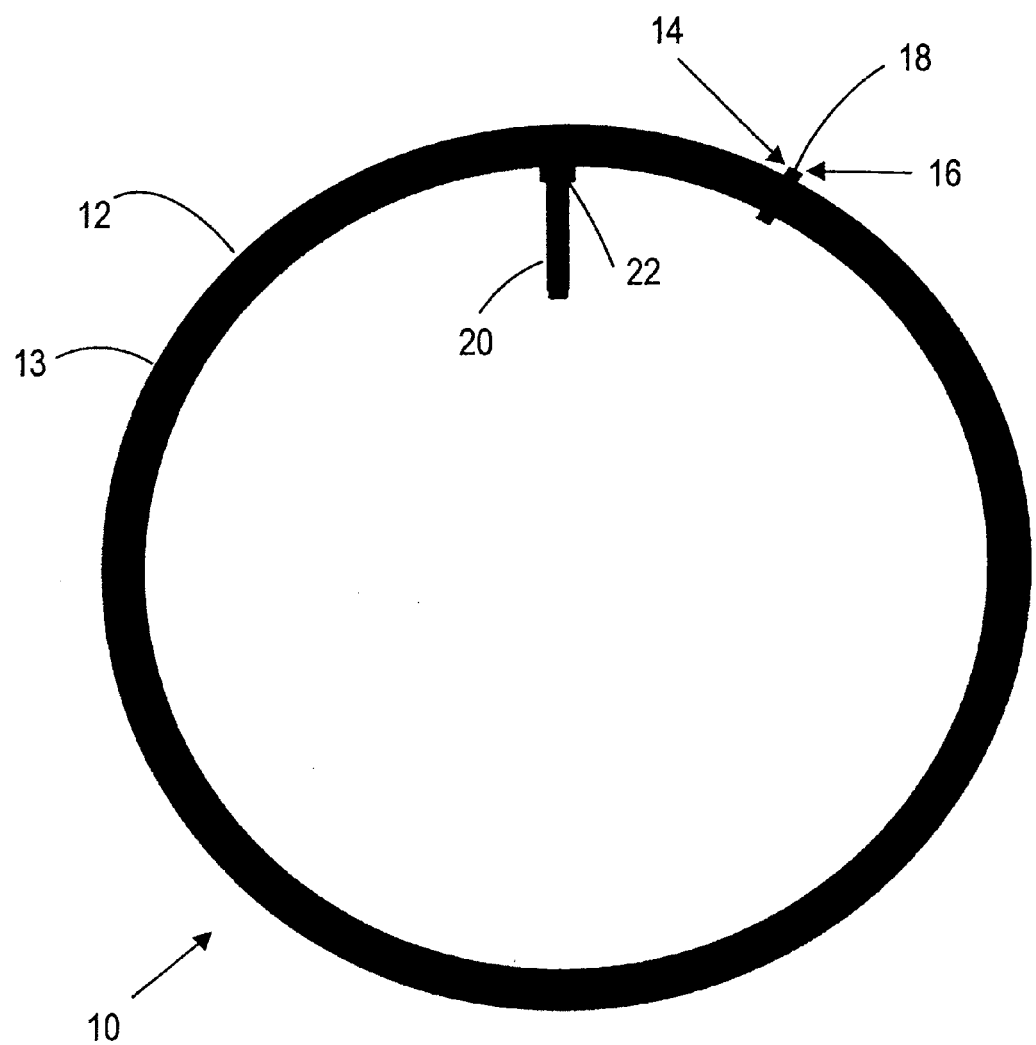

| | | |
|---|---|---|
| DE | 102008023125 A1 | 12/2008 |
| EP | 0 090 222 A1 | 10/1983 |
| EP | 0090221 B1 | 10/1983 |
| GB | 13467 A | 0/1911 |
| GB | 103471 | 9/1917 |
| GB | 446281 A | 4/1936 |
| GB | 2 329 162 A | 3/1999 |
| JP | 55-44832 A | 3/1980 |
| WO | 2010/089080 A1 | 8/2010 |

OTHER PUBLICATIONS

Communication of a Notice of Opposition mailed Mar. 7, 2014, from European Application No. 10702834.2, No English translation.

Panaracer Catalogue, 2007, www.panaracer.com, Super Tube Road & MTB Tube; Green Lite Tube Road & MTB Tube (4 pages).

TUBE SYSTEM

CROSS-REFERENCES TO RELATED APPLICATIONS

This application is a National Stage of International Application No. PCT/EP2010/000626 filed Feb. 2, 2010, and which claims the benefit of German Application No. 10 2009 007 163.6, filed Feb. 3, 2009, the disclosures of which are incorporated herein by reference.

The present invention relates to a tube system, in particular to a tube system for vehicle tires.

Tube systems used in vehicle tires conventionally include rubber tubes or latex tubes which are molded in ring form or whose ends are bonded to one another and which have a wall thickness between 0.45 mm and 3 mm. Such tube systems typically have a relatively high weight and thus considerably contribute to the total weight, for example, of a vehicle tire.

In addition, such tube systems frequently suffer a perforation or a puncture, that is a destruction of the tube wall, under typical driving strains such as driving over a curbside, in particular when the air pressure in the tube system is low.

It is the underlying object of the present invention to provide a tube system which has improved properties with respect to conventional tube systems.

A tube system having the features of claim 1 is provided to satisfy this object.

The tube system in accordance with the invention includes a tube shaped into a ring which comprises polyurethane and has an at least substantially constant wall thickness along its extent, wherein the substantially constant value of the wall thickness is in the range between 0.1 mm and 0.4 mm. The invention furthermore covers a method of manufacturing such a tube system as well as a vehicle tire having such a tube system.

The embodiment of a tube in accordance with the invention at least partly of polyurethane delivers a tube system having very advantageous mechanical properties. In this respect, the elasticity of the tube required for tube systems is simultaneously ensured when the tube has a comparatively small wall thickness in the range between 0.1 mm and 0.4 mm, i.e. a wall thickness which is smaller than the wall thickness of tubes on a rubber basis used in conventional tube systems. The wall thickness of the tube can in particular be between 0.2 mm and 0.3 mm, with a wall thickness of approximately 0.25 mm being preferred.

Despite the lower wall thickness of the tube, the tube system in accordance with the invention has a considerably higher mechanical resilience and a considerably higher resistance to perforations and punctures than conventional tube systems due to the special mechanical properties of polyurethane. The tube system in accordance with the invention can therefore be used at lower air pressures without the mechanical resilience of the tube system thereby being reduced. The grip of the tube system, i.e. the static friction with respect to the ground, can be increased due to the use of lower air pressures and thus an improved force transmission from the vehicle tire to the ground can be achieved. Due to the mechanical properties of polyurethane, the friction losses between the tube and a tire cover surrounding the tube are considerably smaller than in a vehicle tire having a conventional tube system so that the inner friction losses between the tube and the tire cover are considerably reduced on the use of the tube system in accordance with the invention despite a reduced air pressure.

Furthermore, the weight of the tube system in accordance with the invention is greatly reduced due to the small wall thickness of the tube with respect to conventional tube systems.

A substantially constant wall thickness is in particular understood in the sense of the present invention such that the value of the wall thickness along the extent of the tube varies by a maximum of 0.09 mm around a mean value.

Advantageous embodiments of the invention are described in the dependent claims, in the description and in the drawings.

In accordance with an advantageous embodiment of the invention, the tube comprises between 50% by weight and 100% by weight, preferably between 80% by weight and 100% by weight, particularly preferably between 90% and 100% by weight, and most preferred 100% by weight polyurethane.

In accordance with the invention, the polyurethane can preferably be a polyurethane homopolymer, polyurethane copolymer, a polyurethane terpolymer or any desired mixture of two or more of these compounds.

Generally, all polyurethane (co)polymers can be used in the tube system in accordance with the invention, with particularly good results being achieved with tube systems comprising polyester/polyurethane copolymer and in particular consisting of a polyester/polyurethane copolymer. The polyester/polyurethane copolymer can in this respect preferably be a polyester/polyurethane elastomer.

It is proposed in a further development of the idea of the invention to provide a polyurethane in the tube system having a hardness in accordance with DIN 53505 between 60 and 120 Shore A, having particularly preferably between 70 and 100 Shore A and, for example of 86 Shore A. It is further preferred that the density of the polyurethane used is in accordance with DIN EN ISO 1183-1-A between 0.8 and 1.6 g/cm$^3$ and in particular between 1.0 and 1.4 g/cm$^3$. It is further preferred if the polyurethane used has a tensile stress at yield in accordance with DIN 53504-S2 of between 30 and 70 MPa, and in particular between 40 and 60 MPa. Further preferred properties defined in accordance with DIN 53504-S2 are an elongation at break between 400% and 800%, in particular between 500% and 700%, a stress value at 20% elongation between 1.4 and 4.2 MPa, in particular between 2.2 and 3.4 MPa as well as a stress value at 100% elongation between 4.0 and 7.0 MPa, in particular between 5.0 and 6.0 MPa. In addition, a tear strength is preferred for the polyurethane used in accordance with DIN ISO 34-1Bb of between 60 and 90 N/mm, in particular between 70 and 80 N/mm, as well as an abrasion loss in accordance with DIN ISO 4649-A of between 30 and 50 mm$^3$, in particular between 35 and 45 mm$^3$, a compression set in accordance with DIN ISO 815 of between 20% and 30% at ambient and of between 35% and 55% at 70° C. Further preferably there is a tensile strength at yield between 20 and 60 MPa, in particular between 30 and 50 MPa, on storage for 21 days at 80° C. in water in accordance with DIN 53504-S2 and an elongation at break between 500% and 800%, in particular between 600 and 700%, on storage for 21 days in water in accordance with DIN 53504-S2.

As described above, the tube of the tube system is shaped into a ring. The tube can in particular be toroidal, that is the tube surrounds a ring-shaped air chamber free of interruptions.

In accordance with an advantageous embodiment of the invention, the tube includes two ends which are welded to one another to form the ring.

Such a tube system has improved mechanical properties and can furthermore be manufactured with reduced effort.

A weld connection between two regions comprising polyurethane has a higher density and improved mechanical properties and is moreover easier to manufacture in comparison with a bond connection, for example.

A tube comprising polyurethane and having two ends can moreover be manufactured with less effort so that a tube system having a tube with two ends which are welded to one another can, for example, be manufactured more easily than a tube system having a tube molded into a ring.

It is preferred in this respect if the two ends of the tube are welded to one another in an overlapping manner.

With an overlapping weld connection, the inner side or the outer side of the tube wall is welded in a region of the tube, which starts from one end of the tube, to the inner side or to the outer side of the tube wall in a region of the tube, which starts from the other end of the tube.

Such a weld connection has an increased welded surface, and thus an increased seal tightness and mechanical resilience, for example with respect to a blunt weld connection in which the two ends of the tube are each welded to one another at the end face of the tube wall.

It is particularly preferred if the inner side of a first section of the tube wall, which starts from one end of the tube, is welded to the inner side of a second section of the tube wall, which starts from the other end of the tube.

The welding of the inner side of the tube wall in the region of the one end to the inner side of the tube wall in the region of the other end of the tube wall has the advantage that the weld connection formed in this manner forms a rib having a flange-like shape and running outwardly around the welded tube. Such a weld connection is particularly stable with respect to mechanical tensile stress, friction stress and grinding stress.

It is further preferred if the inner side of the tube wall is covered at least partly by a sealing liquid, in particular by a latex sealing liquid.

Such a sealing liquid seals small punctures or holes of the tube occurring in the manufacture or operation of the tube system so that the reliability and the ruggedness of the tube system are increased.

In accordance with an advantageous embodiment of the tube system in accordance with the invention, the tube has a hole into which a valve is inserted.

Such a valve inserted into a hole of the tube connects the interior of the tube to the outside of the tube and thus allows the inflow and outflow of air into the tube system and out of the tube system respectively by a user to increase or decrease the air pressure in the tube system, for example for adaptation to specific circumstances of the ground under a vehicle tire in which the tube system is used.

Such a valve can have a holding section arranged in the interior of the tube and a functional section arranged outside the tube.

It is preferred in this respect if a cross-section of the holding section of the valve has an extent which is larger than the extent of the hole. The valve can be reliably fastened to the tube by such a holding section and a falling out of the valve can be prevented.

The valve preferably has a press fitting sleeve with an inwardly disposed contact surface and the holding section of the valve has a counter-contact surface cooperating with the contact surface.

It is particularly preferred if a section of the tube wall surrounding the hole of the tube is clamped between the contact surface of the press fitting sleeve and the counter-contact surface of the holding section. The valve can be fastened to the tube in a particularly effective manner by such a clamping of such a section of the tube wall between the contact surface of the press fitting sleeve and the counter-pressing sleeve of the holding section of the valve.

Since the clamped section of the tube wall surrounds the hole, it is ensured in this embodiment that the hole is reliably sealed by the contact surface of the press fitting sleeve and the counter-contact surface of the holding section of the valve.

It is particularly preferred if the contact surface of the press fitting sleeve and the counter-contact surface of the holding section are conical. Such a conical embodiment reduces the mechanical strain which the clamped region of the tube wall is exposed to since a pressing of the tube wall toward sharp edges of the holding section and of the press fitting sleeve is avoided.

In particular when such a valve is replaced, it is prevented by this embodiment that the region of the tube wall surrounding the hole is damaged or stamped out of the tube as a whole by the removal of the press fitting sleeve for removing the valve or by the application of another press fitting sleeve on the insertion of a new such valve.

It is particularly advantageous if the press fitting sleeve is fastened to the valve. The fastening can in this respect, for example, take place by a press fitting so that the press fitting sleeve is seated on the valve body in a press fit. Other kinds of fastening are generally also possible. A thread can, for example, be provided at the valve body and the press fitting sleeve or a retainer nut is screwed onto said thread to hold the press fitting sleeve down.

The fastening of the press fitting sleeve in a press fit or in another suitable manner to the valve thus prevents in particular a release of the press fitting sleeve from the valve. This is in particular advantageous since the tube material used in accordance with the invention has a relatively slippery surface and therefore a sufficiently reliable connection of the press fitting sleeve and the holding section of the valve may possibly not be ensured only by the conical contact surfaces. It is prevented by the fastening that the contact pressure acting on the region of the tube wall clamped between the contact surface and the counter-contact surface is reduced, e.g. due to a loosening of the press fitting sleeve. A mechanically particularly fixed and particularly airtight connection between the tube and the valve is thus ensured.

In accordance with an advantageous further development of the invention, a removable valve core is inserted into the functional section of the valve.

Such a removable valve core allows the particularly simple inflow and outflow of air with an open valve and ensures a particularly good sealing effect with a closed valve. In addition, sealing liquid can be introduced particularly simply into the tube through the valve with such a tube system in that the valve core is removed.

It is further preferred if the tube is at least regionally transparent. This can be achieved by a corresponding selection of the polyurethane and has the advantage that, on a use of the tube system with a sealing liquid, e.g. with a latex sealing liquid, the filling level of the sealing liquid in the tube can be checked and monitored particularly simply from the outside, for example by visual inspection.

The present invention relates, in addition to the tube system in accordance with the invention, to a method of manufacturing such a tube system in accordance with the invention. In accordance with this method, the tube of the tube system is manufactured by an extrusion process. Polyurethane can be processed very easily by extrusion.

In accordance with a first advantageous embodiment, a tube material is provided by an endless extrusion process and the tube is manufactured by cutting the tube material to a predefined length. In this manner, the length of the manufactured tube can be checked particularly accurately.

It is particularly preferred if, in the process, the two ends of the tube are connected to one another by welding with hot air. Such a welding ensures a mechanically particularly resilient and particularly tight connection between the two ends of the tube.

It is further preferred if the inner side of a first section of the tube wall, which starts from one end of the tube, is brought into contact with the inner side of a second section of the tube wall, which starts from the other end of the tube, and the first and second sections of the tube wall are welded to one another.

In this embodiment of the method, the inner side of the tube at one end of the tube is therefore placed at the inner side of the tube at the other end of the tube and both ends are then welded to one another at the mutually contacting inner sides of the tube wall.

It is particularly advantageous if the section of the tube wall, which starts from the one end of the tube, is pulled back before the welding and the section of the tube wall, which starts from the other end of the tube, is pushed onto the pulled back section of the tube wall.

In this manner, the inner side of the first section of the tube wall is brought into contact with the inner side of the second section of the tube wall. It is particularly advantageous in this respect that a contact pressure between both sections of the tube wall which facilitates the welding of the two sections of the tube wall arises by the pulling back of the one section of the tube wall and the pushing on of the other section of the tube wall due to the deformation of the tube wall in this region.

It is particularly preferred if, before the welding, two support elements having an at least substantially semi-tubular contour are inserted between the pulled back section of the tube wall and a section of the tube wall engaged around by the pulled back section of the tube wall.

It can also be expedient first to set the two support elements onto the tube in the region of the one end of the tube before the welding and then to pull back the one end of the tube over the support elements and then to push the other end of the tube onto the pulled back end of the tube.

The contour of the support elements can advantageously at least substantially correspond to the contour of the tube in a state pumped up to a predefined operating air pressure.

Support elements having a semi-tubular contour prevent an unwanted deformation of the sections of the tube wall to be welded during the welding and in particular prevent that the sections to be welded move apart from one another during the welding process. In addition, the support elements allow an additional contact pressure to be generated between the sections of the tube wall to be welded, whereby the contact of the sections to one another is improved and the welding is facilitated.

The semi-tubular contour of the support elements allows the support elements to be removed from the tube system again after the welding and the ring formation associated with it.

In accordance with a further advantageous embodiment of the method in accordance with the invention, a hole is formed in the tube by removal of a region of the tube wall and a valve is inserted into the hole, with the cross-section of the hole being adapted to a cross-section of the valve. Such a hole can be formed, for example, by stamping or cutting out.

It is particularly preferred if a press fitting sleeve is pressed onto the valve. In this manner, the valve can be fastened to the tube and in this respect a high mechanical stability of the fastening as well as a reliable sealing of the hole by the press fitting sleeve of the valve can be ensured.

Figure 2:
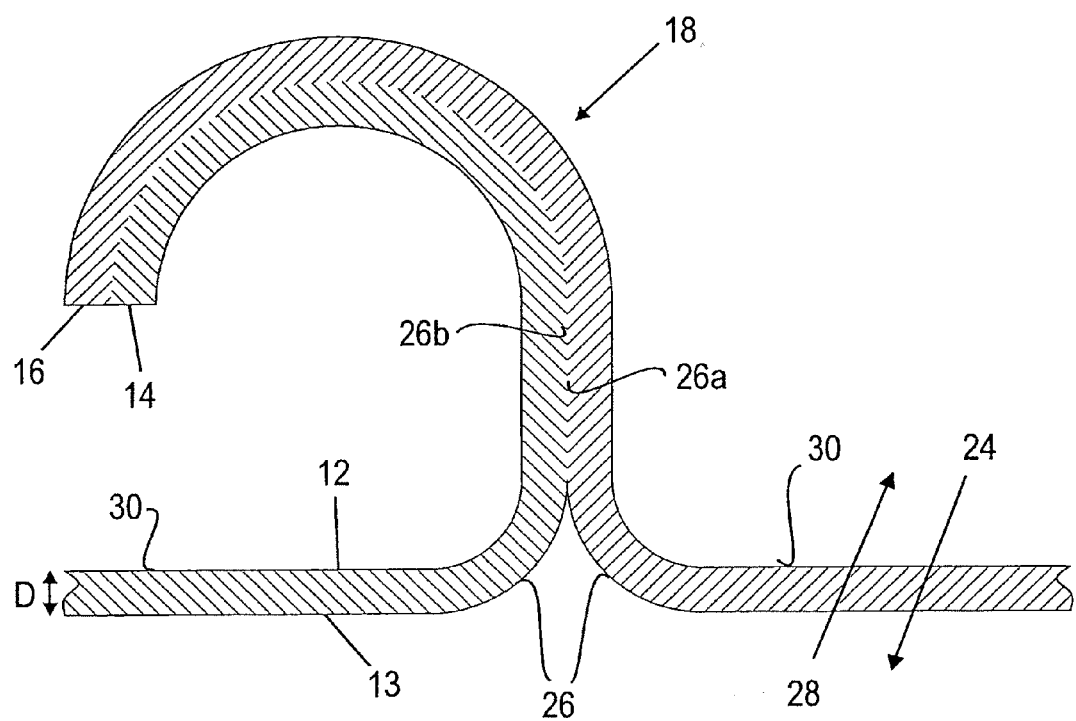
Figure 3:
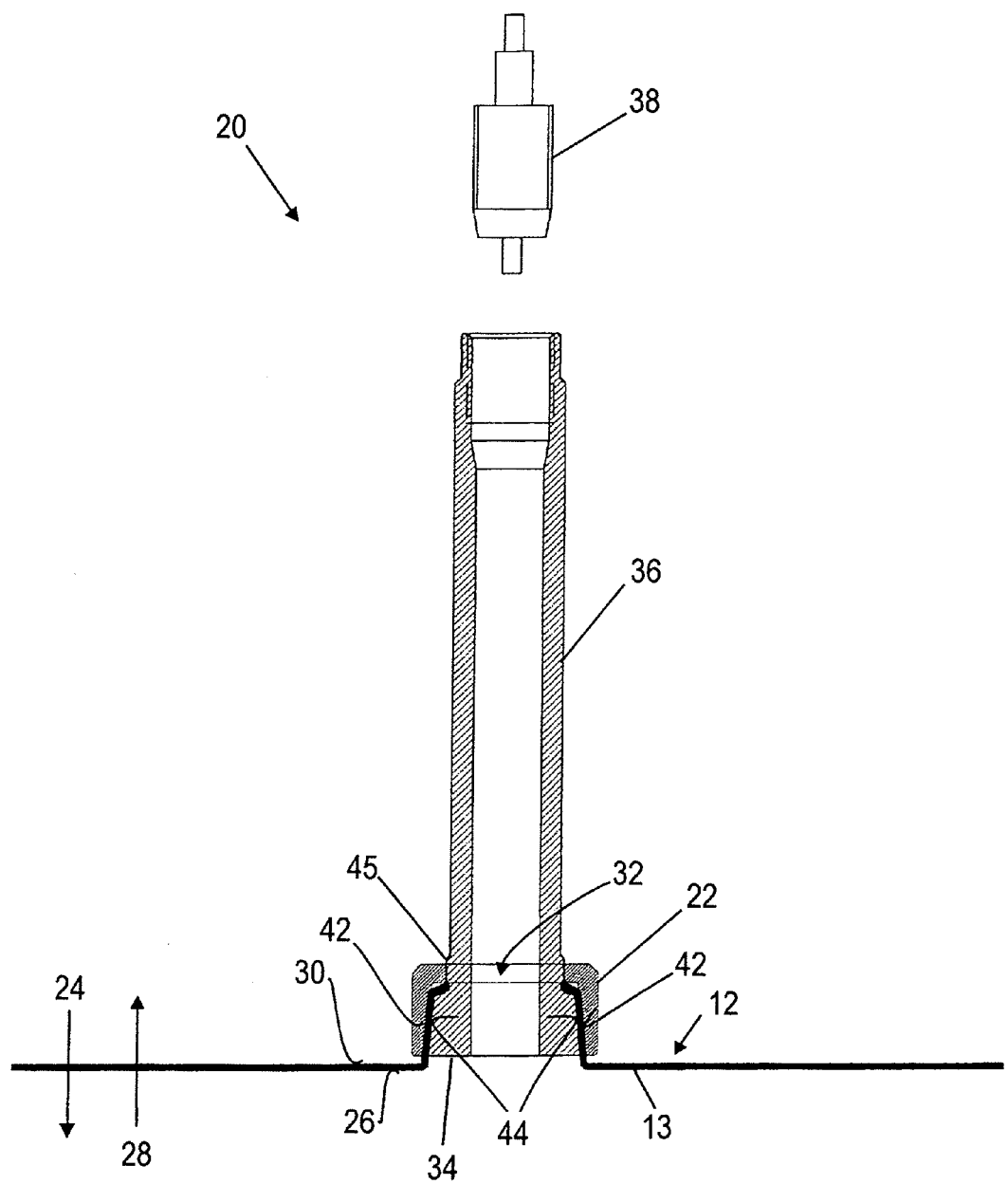
Figure 4:
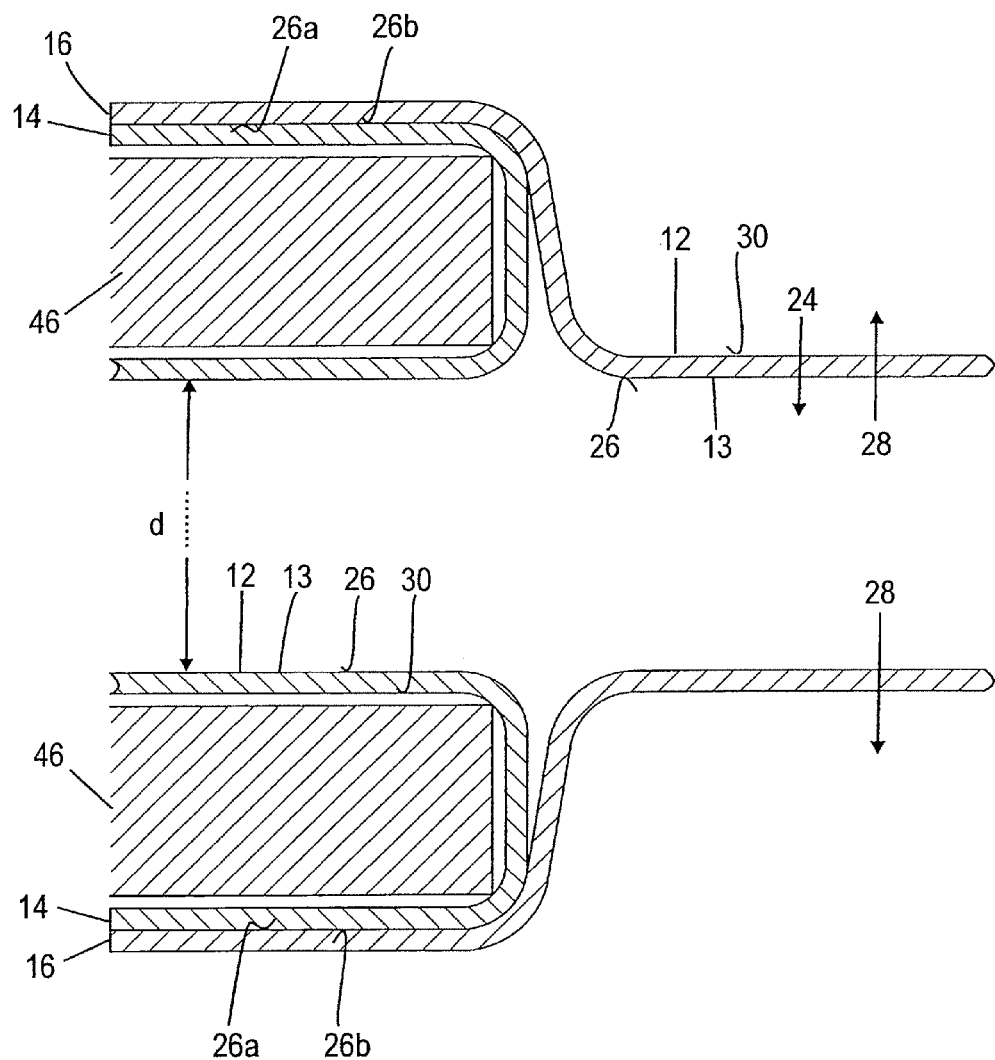

The present invention will be described in the following purely by way of example with reference to an advantageous embodiment and to the enclosed drawings. There are shown:

FIG. 1 a plan view of a tube system in accordance with the invention;

FIG. 2 a longitudinal section through a part region of the tube wall of the tube system in accordance with the invention from FIG. 1 in the region of a welding point;

FIG. 3 a longitudinal section through the valve of the tube system in accordance with the invention from FIGS. 1 and 2 and through a part region of the tube wall surrounding the valve; and FIG. 4 a longitudinal section through a region of a tube which includes two ends of the tube and through a region of two support elements before the welding of the two ends of the tube in accordance with a method in accordance with the invention of manufacturing a tube system shown in FIGS. 1 to 3.

FIG. 1 shows a tube system 10 in accordance with the invention having a toroidal tube 12 comprising polyurethane and shaped into a ring.

The tube 12 is bounded by a tube wall 13 and includes two ends 14 and 16 which are welded to one another to form the torus and form a weld point 18.

A valve 20 is fastened to the tube 12 by means of a press fitting sleeve 22 and will be described in more detail below with reference to FIG. 3.

The tube system 10 is in particular suitable for use in a bicycle tire. The tube system 10 can generally also be used in other tire types, for example in motorcycle tires, automobile tires or tires of trailers.

FIG. 2 shows a longitudinal section through a part region of the tube wall 13 of the tube system of FIG. 1 in the region of the weld point 18.

The tube wall 13 has an inner side 26 facing the interior 24 of the tube 12 and an outer side 30 facing the exterior 28 of the tube. The tube 12 has an approximately constant wall thickness D of 0.2 mm along its extent.

As can be recognized from FIG. 2, the inner side 26a of a first section of the tube wall 13, which starts from one end 14 of the tube 12 is welded to the inner side 26b of a second section of the tube wall 13, which starts from the other end 16 of the tube 12.

FIG. 3 shows a longitudinal section through the valve 20 inserted into the hole 32 of the tube wall 13.

The valve 20 includes a holding section 34 arranged in the interior 24 of the tube 12 and a functional section 36 arranged in the region 28 outside the tube 12 as well as a valve core 38 which can be inserted into the functional section 36 and can be removed from it.

The valve additionally includes a press fitting sleeve 22 having an inwardly disposed contact surface 42 which is in particular of ring shape and is conical. The holding section 34 of the valve 20 has a counter-contact surface 44, in particular of ring shape, which cooperates with the contact surface 42 and which is likewise conical.

A section of the tube wall 13 surrounding the hole 32 of the tube 12 is clamped between the contact surface 42 and the counter-pressing surface 44. In this manner, the valve 20 is reliably fastened to the tube 10 and at the same time the tube 32 is reliably sealed by the contact surface 42 and the counter-contact surface 44.

The press fitting sleeve 22 is pressed in a press fit onto a press fitting section 45, in particular of ring shape, provided at the valve between the functional section 36 and the holding section 34. The press fitting sleeve is particularly reliably fastened to the valve 20 by the pressing onto the press fitting section 45. It is in particular prevented that the press fitting sleeve 22 loosens and as a consequence the clamped section of the tube wall 13 is released from the valve 20.

FIG. 3 shows the valve 20 with a removed valve core 38. With a removed valve core 38, a simple filling of the tube 12 with a sealing liquid through the valve 20 is possible.

FIG. 4 shows a longitudinal section through a region of a tube 12 which includes two ends 14 and 16 of the tube 12.

The tube 12 is used for carrying out a method in accordance with the invention of manufacturing a tube system 10 such as is shown in FIGS. 1 to 3.

FIG. 4 shows the tube 12 directly before the welding of the inner side 26a of a first section of the tube wall 13, which starts from one end 14 of the tube 12, to the inner side 26b of a second section of the tube wall 13, which starts from the other end 16 of the tube 12.

As can be recognized from FIG. 4, the section of the tube wall 13, which starts from the one end 14 of the tube 12, is pulled back, whereas the section of the tube wall 13, which starts from the other end 16 of the tube 12, is pushed onto the pulled back section of the tube wall 13.

Two support elements 46 which have a semi-tubular cross-sectional contour and which together substantially correspond to the cross-sectional contour of the tube 12 are inserted between the pulled back section of the tube wall 13 and a section of the tube wall 13 engaged around by the pulled back section of the tube wall 13.

The spacing d between the two sectional surfaces of the tube wall 13 with the sectional plane of the drawing shown in FIG. 4 is not shown to scale in FIG. 4 and can amount, for example, to between 1 cm and 3 cm in the present embodiment. The spacing can also be much larger depending on the spacing.

The pulled back section of the tube wall 13 is pressed by the support elements 46 toward the pushed on section of the tube wall 13, whereby a tight contact of both sections to one another is achieved, which facilitates the subsequent welding of both sections. The welding of the two sections takes place with hot air in accordance with the present embodiment of the method in accordance with the invention.

REFERENCE NUMERAL LIST 10 tube system
12 tube
13 tube wall
14 end
16 end
18 weld point
20 valve
22 press fitting sleeve
24 interior
26 inner side
28 outwardly disposed region
30 outer side
32 hole
34 holding section
36 functional section
38 valve core
42 contact surface
44 counter-contact surface
45 press fitting section
46 support element

The invention claimed is:

1. A tube system having a tube (12) shaped into a ring, wherein the tube (12) comprises polyurethane and has an at least substantially constant wall thickness along its extent, wherein the substantially constant value of the wall thickness is in the range between 0.1 mm and 0.4 mm,
wherein the tube (12) is toroidal; and wherein the polyurethane comprises or consists of a polyurethane copolymer, a polyurethane terpolymer or any desired mixture of the above compounds.

2. A tube system in accordance with claim 1, wherein the tube system is a tube system for vehicle tires and/or wherein the tube system is mounted in a vehicle tire and/or wherein the vehicle tire is a bicycle tire.

3. A tube system in accordance with claim 1, wherein the tube (12) comprises between 50% by weight and 100% by weight of polyurethane.

4. A tube system in accordance with claim 1, wherein the polyurethane comprises or consists of a polyester/polyurethane copolymer and/or wherein the polyester/polyurethane copolymer is a polyester/polyurethane elastomer.

5. A tube system in accordance with claim 1, wherein the inner side (26) of the tube wall (13) is at least partly covered by a sealing liquid, and/or wherein the sealing liquid is a latex sealing liquid, and/or wherein the tube (12) is at least regionally transparent.

6. A tube system having a tube (12) shaped into a ring, wherein the tube (12) comprises polyurethane and has an at least substantially constant wall thickness along its extent, wherein the substantially constant value of the wall thickness is in the range between 0.1 mm and 0.4 mm,
wherein the tube (12) includes two ends (14, 16) which are welded to one another in an overlapping manner for forming the ring, wherein the inner side (26a) of a first section of the tube wall (13), which starts from one end (14) of the tube (12), is welded to the inner side (26b) of a second section of the tube wall (13), which starts from the other end (16) of the tube (12).

7. A tube system in accordance with claim 6, wherein the tube system is a vehicle tire tube system and/or wherein the tube system is mounted in a vehicle tire and/or wherein the vehicle tire is a bicycle tire.

8. A tube system in accordance with claim 6, wherein the inner side (26) of the tube wall (13) is at least partly covered by a sealing liquid, and/or wherein the sealing liquid is a latex sealing liquid, and/or wherein the tube (12) is at least regionally transparent.

9. A tube system having a tube (12) shaped into a ring, wherein the tube (12) comprises polyurethane and has an at least substantially constant wall thickness along its extent, wherein the substantially constant value of the wall thickness is in the range between 0.1 mm and 0.4 mm,
wherein the tube (12) has a hole (32) into which a valve (20) is inserted which includes a holding section (34) arranged in the interior (24) of the tube (12), a functional section (36) arranged outside the tube (12) and a press fitting sleeve (22), wherein the press fitting sleeve (22) has an inwardly disposed contact surface (42) and the holding section (34) having a counter-contact surface (44) cooperating with the contact surface (42), wherein a section of the tube wall (13) surrounding the hole (32) of the tube (12) is clamped between the contact surface (42) of the press fitting sleeve (22) and the counter-contact surface (44) of the holding section (34) of the valve (20), and wherein the contact surface (42) of the press fitting sleeve (22) and the counter-contact surface

(44) of the holding section (34) have a conical design and the press fitting sleeve (22) is fastened to the valve (20) in a press fit (45).

10. A tube system in accordance with claim 9, wherein the tube system is a vehicle tire tube system.

11. A tube system in accordance with claim 9, wherein a cross-section of the holding section (34) of the valve (20) has an extent which is larger than the extent of the hole (32).

12. A tube system in accordance with claim 9, wherein a removable valve core (38) is inserted into the functional section (36) of the valve (20).

13. A tube system in accordance with claim 9, wherein the inner side (26) of the tube wall (13) is at least partly covered by a sealing liquid, and/or wherein the sealing liquid is a latex sealing liquid and/or wherein the tube (12) is at least regionally transparent.

14. A method of manufacturing a tube system having a tube (12) shaped into a ring, wherein the tube (12) comprises polyurethane and has an at least substantially constant wall thickness along its extent, wherein the substantially constant value of the wall thickness is in the range between 0.1 mm and 0.4 mm,
wherein the tube (12) is manufactured by an extrusion process; and wherein the tube (12) is shaped into a ring by overlapping welding of two ends (14, 16) of the tube (12) to one another, wherein the inner side (26a) of a first section of the tube wall (13), which starts from one end (14) of the tube (12), is brought into contact with the inner side (26b) of a second section of the tube wall (13), which starts from the other end (16) of the tube (12), and wherein the first and second sections of the tube wall (13) are welded to one another.

15. A method in accordance with claim 14, wherein the tube (12) is toroidal; and wherein the polyurethane comprises or consists of a polyurethane copolymer, a polyurethane terpolymer or any desired mixture of the above compounds.

16. A method in accordance with claim 14, wherein the tube (12) includes two ends (14, 16) which are welded to one another in an overlapping manner for forming the ring, wherein the inner side (26a) of a first section of the tube wall (13), which starts from one end (14) of the tube (12), is welded to the inner side (26b) of a second section of the tube wall (13), which starts from the other end (16) of the tube (12).

17. A method in accordance with claim 14, wherein the tube (12) has a hole (32) into which a valve (20) is inserted which includes a holding section (34) arranged in the interior (24) of the tube (12), a functional section (36) arranged outside the tube (12) and a press fitting sleeve (22), wherein the press fitting sleeve (22) has an inwardly disposed contact surface (42) and the holding section (34) having a counter-contact surface (44) cooperating with the contact surface (42), wherein a section of the tube wall (13) surrounding the hole (32) of the tube (12) is clamped between the contact surface (42) of the press fitting sleeve (22) and the counter-contact surface (44) of the holding section (34) of the valve (20), and wherein the contact surface (42) of the press fitting sleeve (22) and the counter-contact surface (44) of the holding section (34) have a conical design and the press fitting sleeve (22) is fastened to the valve (20) in a press fit (45).

18. A method in accordance with claim 14, wherein a tube material is provided by an endless extrusion process and the tube (12) is manufactured by cutting the tube material to a predefined length.

19. A method in accordance with claim 14, wherein the two ends (14, 16) of the tube (12) are connected to one another by welding with hot air.

20. A method in accordance with claim 14, wherein, before the welding, the section of the tube wall (13), which starts from the one end (14) of the tube (12), is pulled back and the section of the tube wall (13), which starts from the other end (16) of the tube (12), is pushed onto the pulled back section of the tube wall (13), and/or wherein two support elements (46) having a semi-tubular contour are inserted between the pulled back section of the tube wall (13) and a portion of the tube wall (13) engaged around by the pulled back section of the tube wall (13) before the welding and/or wherein the pulled back section of the tube wall (13) is pressed toward the support elements (46) during the welding.

21. A method in accordance with claim 14, wherein a hole (32) is formed in the tube (12) by removing a region of the tube wall (13); and wherein a valve (20) is inserted into the hole (32), wherein the cross-section of the hole (32) is matched to a cross-section of the valve (20), and/or wherein the press fitting sleeve (22) is pressed onto the valve (20).

* * * * *